(12) United States Patent
Kuwata et al.

(10) Patent No.: US 7,734,188 B2
(45) Date of Patent: Jun. 8, 2010

(54) DESKEW DEVICE AND DESKEW METHOD

(75) Inventors: Naoki Kuwata, Kawasaki (JP); Tadashi Ikeuchi, Kawasaki (JP); Takatoshi Yagisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 11/590,749

(22) Filed: Nov. 1, 2006

(65) Prior Publication Data
US 2007/0286612 A1  Dec. 13, 2007

(30) Foreign Application Priority Data
Jun. 9, 2006  (JP) ............................. 2006-161507

(51) Int. Cl.
*H04B 10/00* (2006.01)
*H04L 7/00* (2006.01)
*H04J 3/06* (2006.01)
*G11B 20/20* (2006.01)

(52) U.S. Cl. .................. 398/154; 398/140; 398/158; 398/208; 375/371; 375/354; 375/295; 375/228; 714/700; 370/516; 370/517

(58) Field of Classification Search ............... 398/154, 398/140; 714/700
See application file for complete search history.

(56) References Cited

U.S. PATENT DOCUMENTS 4,677,618 A * 6/1987 Haas et al. ................. 714/700
5,157,530 A * 10/1992 Loeb et al. ................. 398/79
6,433,598 B1 * 8/2002 Schultz ...................... 327/161
6,557,110 B2 * 4/2003 Sakamoto et al. .......... 713/503
6,807,377 B1 * 10/2004 Watanabe ................... 398/154
2005/0246596 A1 * 11/2005 Chen et al. ................. 714/700

FOREIGN PATENT DOCUMENTS

JP  2003-60628  2/2003

OTHER PUBLICATIONS

The Institute of Electrical and Electronics Engineers, Inc, "IEEE Std 802.3ae-2002, IEEE Standard for Information exchange between systems- Local and metropolitan area networks—Specific requirements, Part 3: Carrier Sense Multiple Access with Collision Detection (CSMA/CD) Access Method and Physical Layer Specifications, Amendment: Media Access Control (MAC) Parameters, Physical Layers, and Management Parameters for 10 Gb/s Operation" pp. 289 to 310, Online, Aug. 30, 2002, retrieved from Internet May 25, 2006, Internet <URL: http://standards.ieee.org/getieee802/802.3.html>.

* cited by examiner

*Primary Examiner*—Ken N Vanderpuye
*Assistant Examiner*—Oommen Jacob
(74) *Attorney, Agent, or Firm*—Staas & Halsey LLP

(57) ABSTRACT

In a receiver, a skew detector detects a skew between two synchronization symbols having different wavelengths among synchronization symbols included in received signals. A skew rough adjustment calculator calculates a delay compensation amount for each received signal based on the skew and a signal delay characteristic in a transmission path. A variable delay processor deskews the received signals based on the delay compensation amount.

5 Claims, 6 Drawing Sheets

OPTICAL FIBER DELAY CHARACTERISTIC $$L = \frac{S}{d3-d2}$$

S : SKEW
L : TRANSMISSION DISTANCE $t1 = L \times (d1-d4)$
$t2 = L \times (d2-d4)$
$t3 = L \times (d3-d4)$ t1, t2, t3 : DELAY TIME OF SIGNALS HAVING WAVELENGTHS OF $\lambda 1, \lambda 2,$ AND $\lambda 3$ WITH RESPECT TO SIGNAL HAVING WAVELENGTH OF $\lambda 4$

DESKEW DEVICE AND DESKEW METHOD

BACKGROUND OF THE INVENTION

1. Field of the Invention

The present invention generally relates to a technology for correcting a skew. The present invention specifically relates to a technology for performing deskew to correct a skew.

2. Description of the Related Art

With recent progress in high bit-rate data-transmission in an optical communication system, transmission capacity is increasing. To achieving high bit-rate data-transmission, for example, wavelength division multiplexing can be used in which a plurality of signals is transmitted at different wavelengths.

In the wavelength division multiplexing, delay time due to optical fiber transmission is different with respect to each wavelength. Therefore, even if a plurality of signals each having a different wavelength are simultaneously transmitted from a transmission side, the signals do not always reach a reception side at the same time. A difference in transmission delay time of signals generated in the wavelength multiplexing method is generally referred to as skew.

Figure 5:
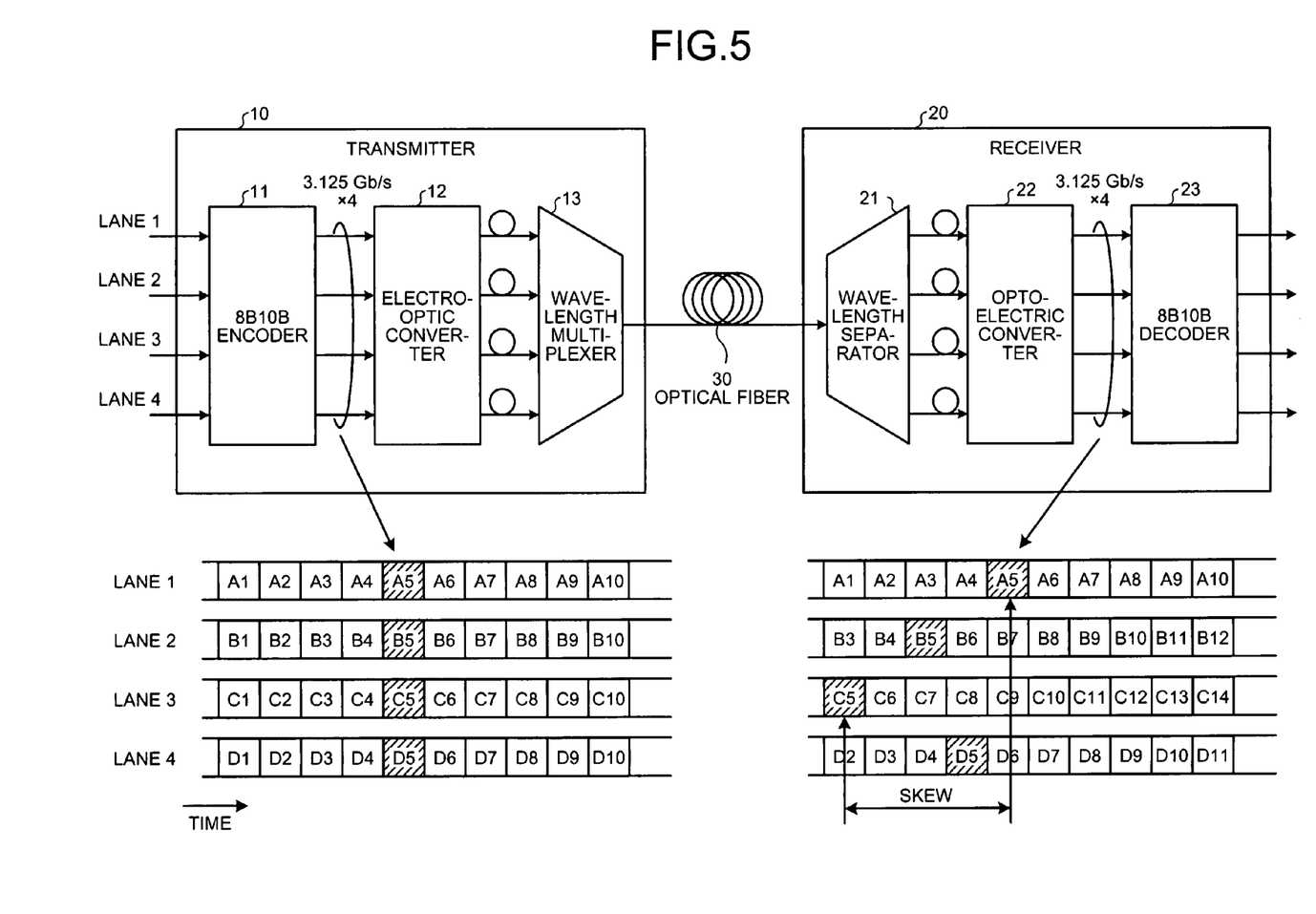
FIG. 5 is a schematic for explaining a skew that occurs in a conventional optical fiber transmission system.

FIG. 5 is a schematic for explaining a skew that occurs in a conventional optical fiber transmission system. The conventional optical fiber transmission system includes a transmitter 10 that transmits optical signals, and a receiver 20 that receives optical signals, which are connected to each other via an optical fiber 30.

The transmitter 10 includes an 8B10B encoder 11, an electro-optic converter 12, and a wavelength multiplexer 13. The 8B10B encoder 11 8B10B-encodes signals received via respective lanes (lanes 1 to 4). The electro-optic converter 12 converts an electric signal into an optical signal. The wavelength multiplexer 13 wavelength-multiplexes the optical signal.

The receiver 20 includes a wavelength demultiplexer 21, an opto-electric converter 22, and an 8B10B decoder 23. The wavelength demultiplexer 21 wavelength-demultiplexes a wavelength-multiplexed optical signal into signals of respective wavelengths. The opto-electric converter 22 converts an optical signal into an electric signal. The 8B10B decoder 23 8B10B-decodes the signals and performs deskew to correct a skew.

It is assumed herein that signals A5, B5, C5, and D5 of different wavelengths are simultaneously transmitted by the transmitter 10. Because of signal transmission delay characteristics of the optical fiber 30 depending on the signal wavelength, phases of the signals received by the receiver 20 are shifted, which generates a skew as shown in FIG. 5.

For example, when the transmission rate of the transmitter 10 is 10 Gb/s (the transmission rate of each lane after 8B10B encoding is 3.125 Gb/s), and an optical signal with a wavelength of 1.3 micrometers is transmitted via a 10-kilometer long single mode fiber (SMF), a skew of 1.4 nanoseconds (for about 4 bits) occurs.

Therefore, a specific synchronization symbol is embedded in a transmission signal by 8B10B encoding on the transmitter 10 side so that deskew is performed for compensating a skew between synchronization symbols detected on the receiver 20 side. As a result, a skew of up to about 30 nanoseconds can be compensated. Reference may be had to, for example, The Institute of Electrical and Electronics Engineers, Inc, "IEEE Std 802.3ae-2002, IEEE Standard for Information exchange between systems-Local and metropolitan area networks-Specific requirements, Part 3: Carrier Sense Multiple Access with Collision Detection (CSMA/CD) Access Method and Physical Later Specifications, Amendment: Media Access Control (MAC) Parameters, Physical Layers, and Management Parameters for 10 Gb/s Operation", pp. 289 to 310, Online, Aug. 30, 2002, retrieved from the Internet on May 25, 2006, <URL: http://standards.ieee.org/getieee802.3.html>.

In the conventional technology, however, when a modulation rate is increased or a transmission distance of the optical fiber 30 is extended, skew is increased to some extent. This makes it difficult to perform deskew appropriately.

For example, when the transmission rate of the transmitter 10 is 40 Gb/s (the transmission rate of each lane after 8B10B encoding is 12.5 Gb/s), and an optical signal with a wavelength of 1.5 micrometers is transmitted via a 40-kilometer long SMF, a skew of 60 nanoseconds occurs, which exceeds the skew compensation capacity of the 8B10B encoding.

Figure 6:
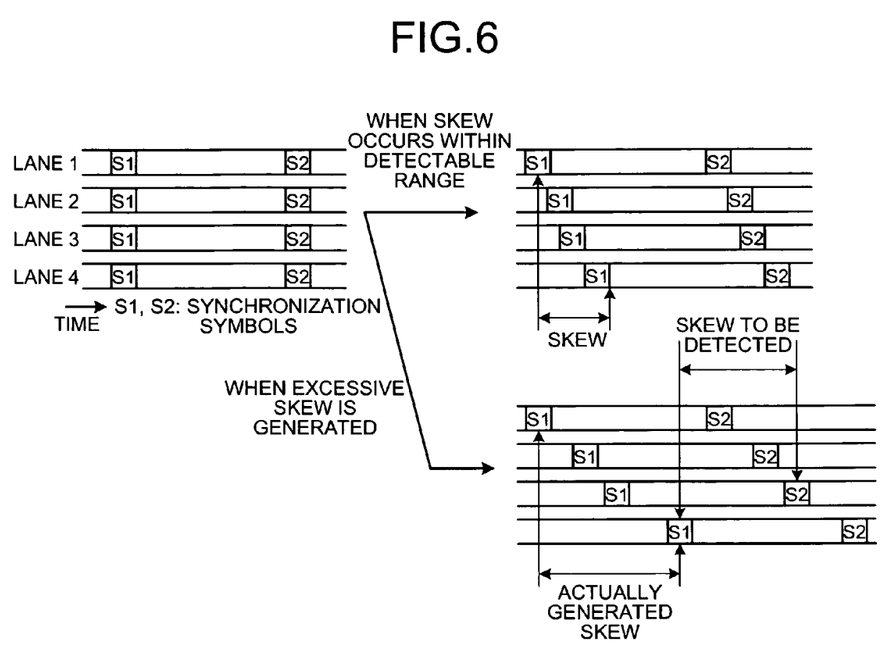
FIG. 6 is a schematic for explaining problems in conventional deskew process.

FIG. 6 is a schematic for explaining problems in a conventional deskew process. In FIG. 6, it is assumed that synchronization symbols S1 and S2 are simultaneously transmitted in different wavelengths from the respective lanes 1 to 4 by the transmitter 10.

For convenience of explanation, the synchronization symbols S1 and S2 are shown differently. However, the synchronization symbols S1 and S2 are equivalent in practice, and the receiver 20 cannot distinguish the synchronization symbols S1 and S2 transmitted at different time points from each other.

The receiver 20 receives the synchronization symbols S1 and S2, and detects a skew. At this time, the receiver 20 determines the synchronization symbols S1 and S2 in each lane received closely in time to be the synchronization symbols S1 and S2 transmitted simultaneously by the transmitter 10, and detects a skew.

As shown in FIG. 6, when an excessive skew has occurred, the receiver 20 detects a skew from reception time of the synchronization symbols S1 and S2. Hence, a skew cannot be discerned correctly, and a correct deskew cannot be performed.

One approach to solve this problem could be to employ an encoding method more complicated than the 8B10B encoding. However, if a complicated encoding method is employed, the signal transmission rate increases, resulting in an increase in power consumption of the transmitter 10 and the receiver 20, or the time taken to achieve synchronization increases.

Thus, there is a need of a technology for performing deskew effectively without complicated encoding even when a large skew has occurred.

SUMMARY OF THE INVENTION

It is an object of the present invention to at least partially solve the problems in the conventional technology.

According to an aspect of the present invention, a deskew device that corrects skew between at least three signals having different wavelengths, includes a detector that detects a first difference in delay time between two synchronization signals having different wavelengths among synchronization signals included in received signals, a calculator that calculates a delay compensation amount for each of the received signals based on the first difference and a signal delay characteristic in a transmission path, and a deskew unit that performs first deskew of the received signals based on the delay compensation amount.

According to another aspect of the present invention, a deskew method of correcting skew between at least three signals having different wavelengths, includes detecting a difference in delay time between two synchronization signals having different wavelengths among synchronization signals included in received signals, calculating a delay compensation amount for each of the received signals based on the difference in delay time and a signal delay characteristic in a transmission path, and deskewing the received signals based on the delay compensation amount.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
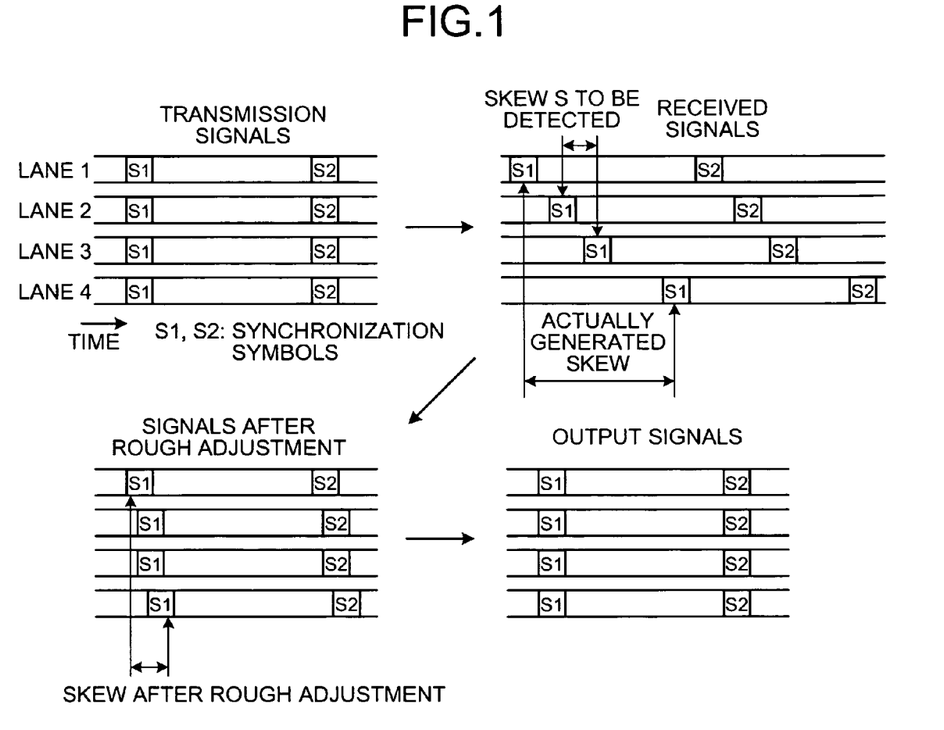
FIG. 1 is a schematic for explaining the concept of a deskew process according to an embodiment of the present invention.
Figure 2:
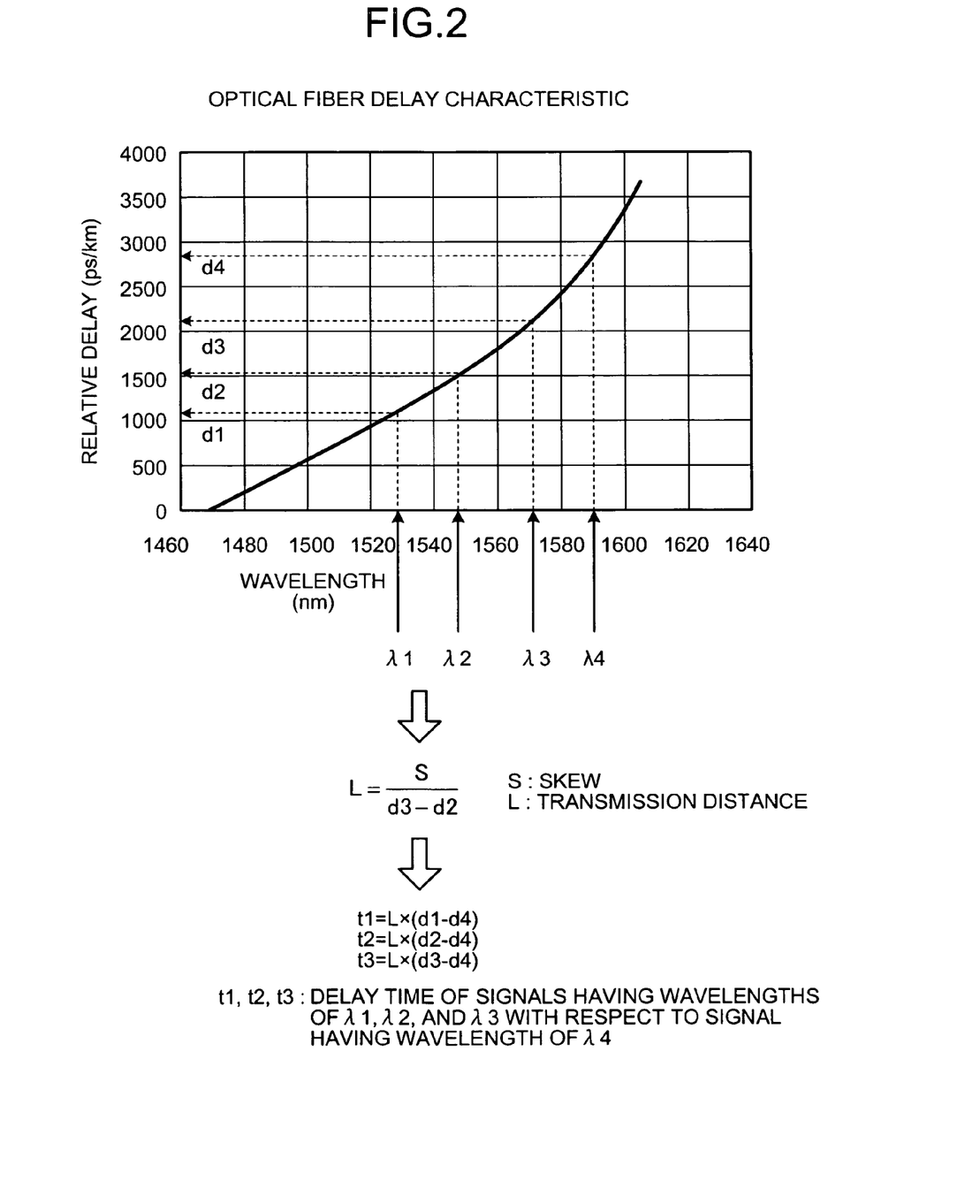
FIG. 2 is a graph for explaining calculation of signal delay in the deskew process.

FIG. 1 is a schematic for explaining the concept of a deskew process according to an embodiment of the present invention, and FIG. 2 is graph for explaining calculation of signal delay in the deskew process.

FIG. 1 depicts an example of synchronization symbols S1 and S2 in respective lanes 1 to 4 transmitted simultaneously by an optical signal transmitter via an optical fiber transmission path, and the synchronization symbols S1 and S2 in the respective lanes 1 to 4 received by a receiver. Referring to FIG. 1, a skew occurs in the synchronization symbols S1 and S2.

In the deskew process, the receiver detects skew S between synchronization symbols S1 of two different wavelengths, and calculates the amount of delay compensation (hereinafter, "delay compensation amount") for each received signal based on the skew S and delay characteristics of the synchronization symbols S1 in the optical fiber through which the synchronization symbols S1 are transmitted. The receiver then performs deskew for the received signal based on the delay compensation amount.

In an example of FIG. 2, among skews between the respective synchronization symbols S1 in the lanes 1 to 4, skew S between the synchronization symbol S1 with a wavelength of $\lambda 2$ and that with a wavelength of $\lambda 3$ is detected. Respective wavelengths $\lambda 1$ to $\lambda 4$ are known values, and satisfy a relationship of $\lambda 1 < \lambda 2 < \lambda 3 < \lambda 4$.

Then, relative delays d2 and d3 of the synchronization symbols S1 having the wavelengths of $\lambda 2$ and $\lambda 3$ are detected based on delay characteristics of the optical fiber as shown in FIG. 2. In the graph of delay characteristics in FIG. 2, a horizontal axis indicates a wavelength of an optical signal, and a vertical axis indicates relative delay, i.e., delay time per unit distance when the optical signal is transmitted via the optical fiber.

A transmission distance L of the synchronization symbols S1 is then calculated by the following equation:

$$L = S/(d3-d2).$$

Thereafter, the delay time of the respective synchronization symbols S1 is calculated. As shown in FIG. 2, delay times t1 to t3 of the respective synchronization symbols S1, the wavelengths of which with respect to the synchronization symbol S1 of the wavelength of $\lambda 4$ are $\lambda 1$ to $\lambda 3$, respectively, are calculated by the following equations:

$$t1 = L \times (d1-d4),$$

$$t2 = L \times (d2-d4), \text{ and}$$

$$t3 = L \times (d3-d4).$$

Delays between signals in the lanes 1 to 4 are roughly adjusted based on the delay times t1 to t3. A delay between the respective signals is accurately corrected by detecting a skew between the signals in the lanes 1 to 4. Thus, even when a large skew has occurred, deskew can be performed effectively without complicated encoding. Further, a correctable range of the skew can be enlarged to about three times as large as the conventional range.

In the above description, a skew between the synchronization symbol S1 of the wavelength of $\lambda 2$ and the synchronization symbol S1 of the wavelength of $\lambda 3$ is used to determine the transmission distance L. However, when the skew between the synchronization symbol S1 of the wavelength of $\lambda 2$ and the synchronization symbol S1 of the wavelength of $\lambda 3$ is too large, the reception time thereof is close to that of a signal transmitted at the next timing. Accordingly, there is a possibility that the receiver detects a skew between the synchronization symbol S1 and the synchronization symbol S2.

To solve this problem, the receiver can determine whether a detected skew is equal to or larger than a predetermined threshold using the synchronization symbols of the wavelengths of $\lambda 2$ and $\lambda 3$. In this case, when the skew is larger than the predetermined threshold, the receiver detects a skew smaller than the predetermined threshold among skews between the synchronization symbols of two different wavelengths. The receiver then calculates the transmission distance L based on the detected skew and relative delay corresponding to the wavelengths of the two synchronization symbols.

For example, when skew S' between synchronization symbols of the wavelengths of $\lambda 2$ and $\lambda 3$ is selected as the skew smaller than the predetermined threshold, the transmission distance L is calculated based on the skew S' and relative delays d1 and d2 corresponding to the wavelengths $\lambda 2$ and $\lambda 3$ of the two synchronization symbols.

Figure 3:
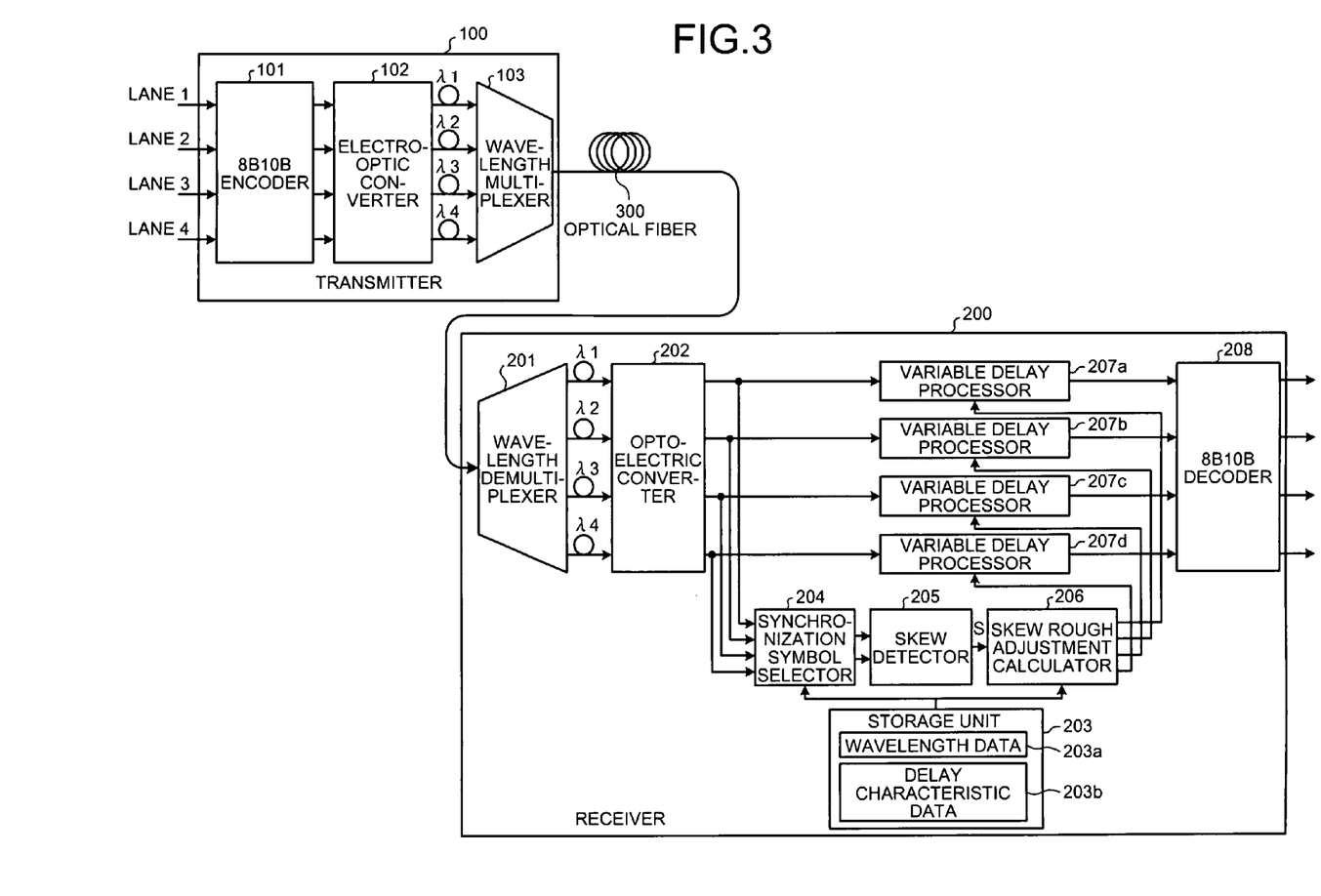
FIG. 3 is a functional block diagram of an optical fiber transmission system according to the embodiment.

FIG. 3 is a functional block diagram of an optical fiber transmission system according to the embodiment. The optical fiber transmission system includes a transmitter 100 that transmits optical signals, and a receiver 200 that receives optical signals, which are connected to each other via an optical fiber 300.

The transmitter 100 includes an 8B10B encoder 101, an electro-optic converter 102, and a wavelength multiplexer 103.

The 8B10B encoder 101 8B10B-encodes signals received via the respective lanes (lanes 1 to 4). The 8B10B encoder 101 embeds a specific synchronization symbol to be used for deskew in a transmission signal at the time of 8B10B encoding. The electro-optic converter 102 converts an electric signal to an optical signal. The wavelength multiplexer 103 wavelength-multiplexes the optical signal.

The receiver 200 includes a wavelength demultiplexer 201, an opto-electric converter 202, a storage unit 203, a synchronization symbol selector 204, a skew detector 205, a skew rough adjustment calculator 206, variable delay processors 207a to 207d, and an 8B10B decoder 208.

The wavelength demultiplexer 201 demultiplexes a wavelength-multiplexed optical signal into signals of respective wavelengths. The opto-electric converter 202 converts an optical signal into an electric signal. The storage unit 203 is a storage device such as a memory, and stores wavelength data 203a and delay characteristic data 203b.

The wavelength data 203a is data on a wavelength of each signal transmitted through the respective lanes 1 to 4. The delay characteristic data 203b is data on delay characteristics of the optical fiber 300 as shown in FIG. 2. Specifically, a value of relative delay dn is stored therein in association with a value of each wavelength λn. The delay characteristic data 203b can be information on a function dn=f (λn) for associating the value of wavelength λn with the value of relative delay dn.

The synchronization symbol selector 204 selects two synchronization symbols S1 of a different wavelength, as shown in FIG. 1, from signals transmitted through the lanes 1 to 4. The synchronization symbol selector 204 selects two synchronization symbols S1 having the wavelengths of λ2 and λ3, respectively, from signals in the lanes 1 to 4.

The skew detector 205 detects skew S between the two synchronization symbols S1 selected by the synchronization symbol selector 204. The skew rough adjustment calculator 206 calculates delay times t1, t2, and t3 of the synchronization symbols S1 in other lanes (in FIG. 2, lanes through which a signal with a wavelength of λ1, λ2, or λ3 is transmitted) with respect to the synchronization symbol S1 in a reference lane (in FIG. 2, the lane through which the signal with a wavelength of λ4 is transmitted) by equations shown in FIG. 2, and outputs information on delay compensation amounts −t1, −t2, and −t3 to the variable delay processors 207a to 207d in the lanes other than the reference lane.

The variable delay processors 207a to 207d receive the information on the delay compensation amounts −t1, −t2, and −t3 from the skew rough adjustment calculator 206. The variable delay processors 207a to 207d change a signal phase by the delay compensation amount −t1, −t2, or −t3 to roughly adjust the delay between the signals in the lanes 1 to 4.

The 8B10B decoder 208 detects a skew between the signals in the lanes 1 to 4, which have been subjected to the rough adjustment by the variable delay processors 207a to 207d, and performs deskew as well as 8B10B-decoding the signals.

While 8B10B encoding is used herein as an example to perform deskew, other methods can be employed, including 64B66B encoding and a synchronization method using a frame synchronization pattern in a synchronous optical network (SONET).

Figure 4:
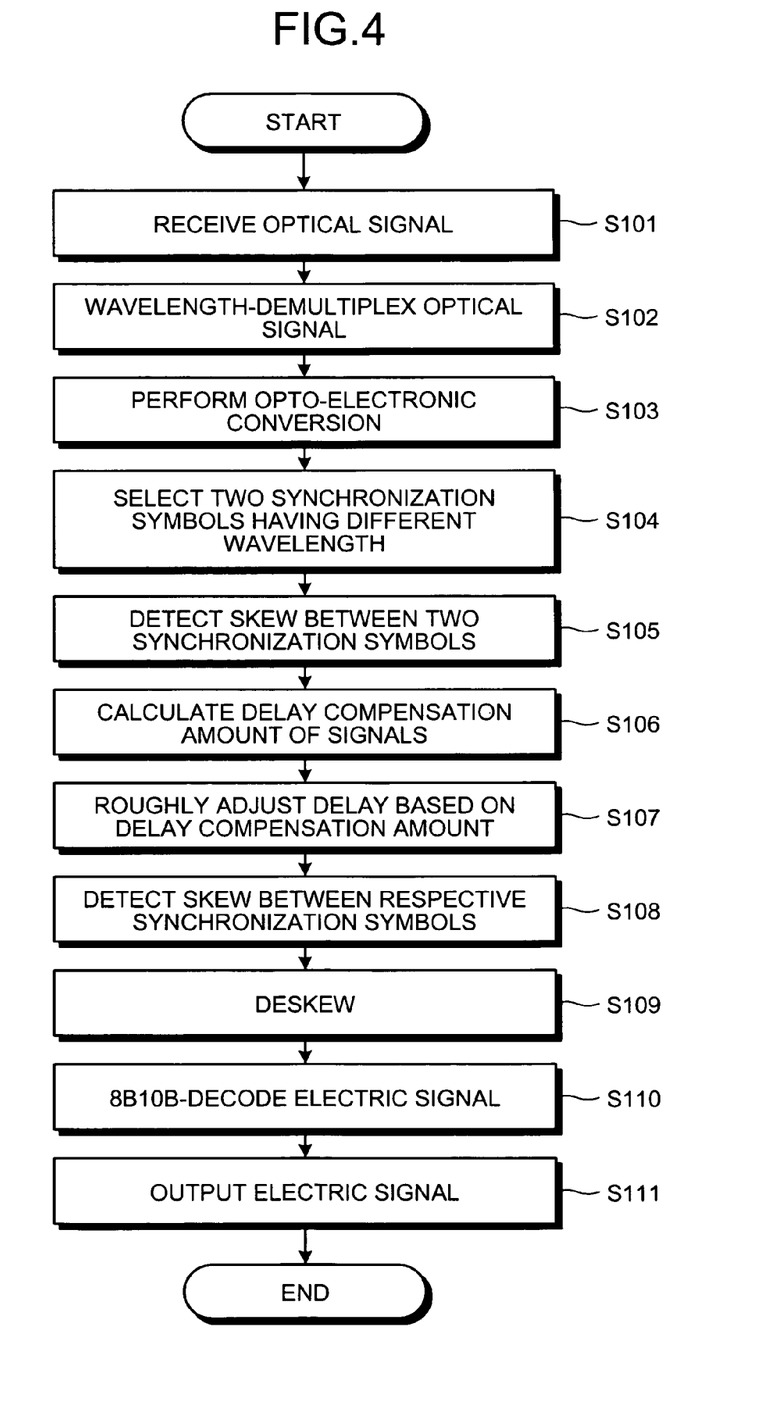
FIG. 4 is a flowchart of the deskew process.

FIG. 4 is a flowchart of the deskew process. First, in the receiver 200, the wavelength demultiplexer 201 receives an optical signal from the transmitter 100 (step S101), and wavelength-demultiplexes the optical signal (step S102).

The opto-electric converter 202 then converts optical signals to electric signals (step S103). Thereafter, the synchronization symbol selector 204 selects two synchronization symbols S1 having different wavelengths of λ2 and λ3, respectively, from signals transmitted through the respective lanes (step S104).

Subsequently, the skew detector 205 detects skew S between the signals selected by the synchronization symbol selector 204 (step S105). The skew rough adjustment calculator 206 calculates signal delay compensation amounts −t1, −t2, and −t3 by the equations shown in FIG. 2 (step S106).

The variable delay processors 207a to 207d then roughly adjust delays between the signals in the respective lanes 1 to 4 based on the delay compensation amounts −t1, −t2, and −t3 calculated by the skew rough adjustment calculator 206 (step S107).

The 8B10B decoder 208 detects a skew between the synchronization symbols S1 in the respective lanes 1 to 4 after the delays are roughly adjusted (step S108), and performs deskew based on the detected skew (step S109).

The 8B10B decoder 208 8B10B-decodes the electric signals (step S110), and outputs the decoded electric signals (step S111). Thus, the deskew process ends.

While four lanes are used in the above description to transmit signals, the number of lanes is cited merely by way of example and without limitation. There can be any number of the lanes if they are three or more.

As described above, according to the embodiment, in the receiver 200, the skew detector 205 detects skew S between two synchronization symbols of a different wavelength (a difference in delay time between two synchronization signals of a different wavelength) among those in received-signals. The skew rough adjustment calculator 206 calculates the delay compensation amounts −t1, −t2, and −t3 for the respective received signals based on the skew S and signal delay characteristics in the transmission path. The variable delay processors 207a to 207d perform deskew for the respective received signals based on the delay compensation amounts −t1, −t2, and −t3. As a result, even when a large skew has occurred (there is a large difference in delay time), deskew can be effectively performed without complicated encoding.

After the variable delay processors 207a to 207d have performed deskew for the respective received signals based on the delay compensation amounts −t1, −t2, and −t3, the 8B10B decoder 208 detects a skew between synchronization symbols of a different wavelength (a difference in delay time between synchronization signals of a different wavelength), and performs deskew again for the signals based on the detected skew. Therefore, delay compensation between respective received signals can be accurately performed.

The storage unit 203 stores information relating to the delay time per unit distance, depending on the signal wavelength in the transmission path. The skew rough adjustment calculator 206 obtains information on the delay time per unit distance corresponding to the wavelength of respective received signals based on the stored information. The skew rough adjustment calculator 206 calculates the delay compensation amounts −t1, −t2, and −t3 of the respective received signals based on the obtained delay time per unit distance and the skew S. As a result, the delay compensation amounts −t1, −t2, and −t3 can be efficiently calculated based on the information on delay characteristics of the transmission path.

The skew rough adjustment calculator 206 calculates the delay compensation amounts −t1, −t2, and −t3 of respective received signals based on a ratio between a difference in delay time per unit time (d3−d2) obtained from the wavelength of two synchronization symbols, from which the skew S has been detected, and a difference in delay time per unit time (d1−d4, d2−d4, and d3−d4) obtained from the wavelength of other synchronization symbols, and the skew S. Thus, the delay compensation amounts −t1, −t2, and −t3 can be easily and efficiently calculated from the ratio between the differences in delay time.

When the skew detector 2b5 has detected the skew S between two synchronization symbols, it is determined whether the skew S is larger than a predetermined threshold.

When the skew S is larger than the predetermined threshold, a skew smaller than the predetermined threshold is detected among skews between two synchronization symbols of a different wavelength. As a result, a skew (a difference in delay time) required for calculating the delay compensation amount can be appropriately selected.

Of the respective processes explained in the embodiment, all or a part of the process explained as being performed automatically can be performed manually, or all or a part of the process explained as being performed manually can be performed automatically in a known method.

The process procedures, the control procedures, specific names, data and information containing various parameters mentioned in the description and the drawings can be arbitrarily changed unless otherwise specified.

The constituent elements of the respective devices are functionally conceptual, and need not necessarily be configured physically as shown in the drawings. That is, the arrangement of the respective devices is not limited to that shown in the drawings, and can be functionally or physically separated or integrated, partly or wholly, according to the load or usage.

The same function of the respective devices can be entirely or partially realized by a central processing unit (CPU) or a computer program executed by CPU. The respective devices can also be implemented in wired-logic hardware.

The deskew explained in the embodiment can be performed by software. In other words, a computer program can be executed on a computer to perform the deskew. The computer program can be distributed or downloaded via a network such as the Internet, or can be stored in a computer-readable recording medium such as a hard disk, a flexible disk (FD), a compact disk-read only memory (CD-ROM), a magneto-optical disk (MO), and a digital versatile disk (DVD) to be read therefrom and executed by a computer.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A deskew device that corrects skew between at least three signals having different wavelengths, the deskew device comprising:
    a detector that detects a first difference in delay time between two synchronization signals having different wavelengths among synchronization signals included in received signals, and determines, upon detecting the first difference, whether the first difference is larger than a threshold, and, when the first difference is larger than the threshold, detects two synchronization signals having different wavelengths between which a second difference in delay time is smaller than the threshold;
    a calculator that calculates, when the first difference is not larger than the threshold, a delay compensation amount for each of the received signals based on the first difference and a signal delay characteristic in a transmission path, and calculates, when the first difference is larger than the threshold, the delay compensation amount based on the second difference and a signal delay characteristic in a transmission path; and
    a deskew unit that performs first deskew of the received signals based on the delay compensation amount.

2. The deskew device according to claim 1, wherein the deskew unit further detects a third difference in delay time between respective synchronization signals having different wavelengths after the first deskew, and performs second deskew of the received signals based on the third difference.

3. The deskew device according to claim 1, further comprising
    a storage unit that stores information relating to delay time per unit distance depending on a signal wavelength in the transmission path, wherein the calculator obtains information on delay time per unit distance corresponding to a wavelength of each of the received signals from the storage unit, and calculates the delay compensation amount for each of the received signals based on a difference between the delay time per unit distance and the delay time detected by the detector.

4. The deskew device according to claim 3, wherein the calculator calculates the delay compensation amount for each of the received signals based on a ratio between a difference in delay time per unit distance obtained from wavelengths of the two synchronization signals, from which the first difference or the second difference has been detected, and a difference in delay time per unit distance obtained from wavelengths of other synchronization signals, and one of the first difference and the second difference.

5. A deskew method of correcting skew between at least three signals having different wavelengths, the deskew method comprising:
    detecting a first difference in delay time between two synchronization signals having different wavelengths among synchronization signals included in received signals;
    determining, upon detecting the first difference, whether the first difference is larger than a threshold, and when the first difference is larger than the threshold, detects two synchronization signals having different wavelengths between which a second difference in delay time is smaller than the threshold;
    calculating, when the first difference is not larger than the threshold, a delay compensation amount for each of the received signals based on the first difference in delay time and a signal delay characteristic in a transmission path;
    calculating, when the first difference is larger than the threshold, the delay compensation amount based on the second difference and a signal delay characteristic in a transmission path; and
    deskewing the received signals based on the delay compensation amount.

* * * * *